United States Patent
Stoops et al.

(10) Patent No.: US 10,024,880 B2
(45) Date of Patent: Jul. 17, 2018

(54) ATHERMAL HUNG MASS ACCELEROMETER WITH REDUCED SENSITIVITY TO LONGITUDINAL TEMPERATURE GRADIENTS

(71) Applicant: Raytheon Company, Waltham, MA (US)

(72) Inventors: Lorne Stoops, Hermosa Beach, CA (US); Javier B. Heyer, Culver City, CA (US)

(73) Assignee: Raytheon Company, Waltham, MA (US)

( * ) Notice: Subject to any disclaimer, the term of this patent is extended or adjusted under 35 U.S.C. 154(b) by 210 days.

(21) Appl. No.: 15/161,218

(22) Filed: May 21, 2016

(65) Prior Publication Data

US 2017/0336434 A1 Nov. 23, 2017

(51) Int. Cl.
*G01P 15/11* (2006.01)
*G01P 15/00* (2006.01)

(52) U.S. Cl.
CPC .............. *G01P 15/11* (2013.01); *G01P 15/005* (2013.01)

(58) Field of Classification Search
CPC ........ G01P 15/005; G01P 15/02; G01P 15/11; G01B 5/06; G01B 7/02; B06B 1/085
USPC .......................................... 73/514.35, 514.31
See application file for complete search history.

(56) References Cited

U.S. PATENT DOCUMENTS

| | | | |
|---|---|---|---|
| 3,453,573 A | 7/1969 | Kyle | |
| 3,508,445 A | 4/1970 | Penney, Jr. et al. | |
| 4,563,643 A | 1/1986 | Leschek et al. | |
| 4,816,759 A | 3/1989 | Ames et al. | |
| 4,866,418 A | 9/1989 | Dobler et al. | |
| 5,214,379 A | 5/1993 | Chern | |
| 5,756,896 A | 5/1998 | Schendel | |
| 6,062,081 A | 5/2000 | Schendel | |
| 6,912,902 B2 | 7/2005 | Malametz et al. | |
| 7,104,128 B2 | 9/2006 | Inglese et al. | |
| 7,757,555 B2 | 7/2010 | Pan et al. | |
| 8,995,066 B2 | 3/2015 | Doyle et al. | |
| 2003/0071612 A1 | 4/2003 | Daalmans | |
| 2003/0193396 A1 | 10/2003 | Daalmans et al. | |

(Continued)

FOREIGN PATENT DOCUMENTS

DE 102007005297 A1 11/2007
EP 0816855 A1 1/1998

OTHER PUBLICATIONS

Accelerometer Design, Chapter 2, http://14.139.116.29/bitstream/10603/2272/8/08_chapter%202.pdf, 2008.

(Continued)

*Primary Examiner* — Peter Macchiarolo
*Assistant Examiner* — Irving A Campbell
(74) *Attorney, Agent, or Firm* — Eric A. Gifford

(57) ABSTRACT

An athermal open-loop hung mass accelerometer configures the CTE of the sensor heads such that any growth by the body in response to a body temperature gradient along the longitudinal axis is offset by the growth of the sensor heads in the equal and opposite direction to null the effects of the temperature gradient. In many configurations, the sensor head CTE is strictly less than the body CTE and typically between 60-80% of the body CTE to null the effects of the predicted body temperature gradient.

17 Claims, 8 Drawing Sheets

(56) References Cited

U.S. PATENT DOCUMENTS

| | | | |
|---|---|---|---|
| 2009/0140729 A1* | 6/2009 | Roziere | G01D 5/2086 324/207.17 |
| 2010/0083761 A1 | 4/2010 | Dwyer et al. | |
| 2011/0203377 A1 | 8/2011 | Seto | |
| 2011/0252887 A1 | 10/2011 | Cardarelli | |
| 2014/0157897 A1 | 6/2014 | Anagnost et al. | |
| 2015/0204896 A1* | 7/2015 | Ames | G01P 15/11 73/497 |

OTHER PUBLICATIONS

Blueline Engineering, Inductive Eddy Current Technology, http://www.bluelineengineering.com/Eddy%20Curent%20Sensors.html, 2012.

Garcia-Martin et al.,"Non-Destructive Techniques Based on Eddy Current Testing," Sensors 2011, 11, ISSN, pp. 2525-2565, published Feb. 28, 2011.

Becka et al., "A High Reliability Solid State Accelerometer," AIAA Guidance, Navigation and Control Conference and Exhibit 18—Aug. 21, 2008, Honolulu, Hawaii.

Hopkins et al, The Silicon Oscillating Accelerometer: A High-Performance MEMS Accelerometer for Precision Navigation and Strategic Guidance Applications, Presented at the Institute of Navigation o 61st Annual Meeting, Cambridge, MA Jun. 27-29, 2005.

* cited by examiner

ATHERMAL HUNG MASS ACCELEROMETER WITH REDUCED SENSITIVITY TO LONGITUDINAL TEMPERATURE GRADIENTS

BACKGROUND OF THE INVENTION

Field of the Invention

This invention relates to accelerometers and more particularly to a class of open-loop hung mass accelerometers that use differential Eddy current sensing to provide improved sensitivity at lower cost and with higher reliability.

Description of the Related Art

The basic, open-loop accelerometer consists of a proof mass attached to a spring or flexure. The mass is constrained to move only in-line with the spring. Acceleration causes deflection of the mass. The displacement of the mass is measured. The acceleration is derived from the values of displacement, mass, and the spring constant. The system must not be driven at a resonance that would cause it to exceed its travel limits and bottom out. One way to achieve this is to damp the system. Another way is to mount the accelerometer on an isolation system. A closed-loop accelerometer typically achieves higher performance by using a feedback loop to cancel the deflection, thus keeping the mass nearly stationary. Whenever the mass deflects, the feedback loop causes an electric coil to apply an equally negative force on the mass, canceling the motion. Acceleration is derived from the amount of negative force applied. Because the mass barely moves, the sensitivity to nonlinearities of the spring and damping system are greatly reduced. In addition, this accelerometer provides for increased bandwidth past the natural frequency of the sensing element. (Excerpted from Wikipedia "Inertial Navigation System" and "Accelerometer").

Conceptually, an accelerometer behaves as a damped mass on a spring. When the accelerometer experiences acceleration, the mass is displaced to the point that the spring is able to accelerate the mass at the same rate as the accelerometer body. The displacement is then measured to give the acceleration.

The performance of an accelerometer is primarily a combination of its bias stability and scale factor error. Bias stability is the acceleration measured by the device when the actual acceleration is zero. This is caused by mechanical imperfections in the device and noise in the electronics. The scale factor error reflects the error as proportional to the actual acceleration. If for example the device is accelerating at 1 g (32 feet/sec/sec) [1 g is either 32.2 ft/sec/sec or 9.8 meters/sec/sec] and the device reads out 1.1 g, the scale factor error is 10%.

U.S. Pat. No. 9,121,865 issued Sep. 1, 2015 entitled "Hung Mass Accelerometer with Differential Eddy Current Sensing" and assigned to Raytheon Company introduced a new class of open-loop accelerometer that provides improved performance at lower cost and with higher reliability. As illustrated in FIGS. 5a and 5b and as described in the corresponding text of that patent, an embodiment of an open-loop hung mass accelerometer 100 sans the electronics comprises a single piece of metal 101 (e.g. Ti 6Al-4V or 17-4PH stainless steel) machined to form a body 102, top and bottom flexures 104 and 106 and a proof mass 108 suspended between the flexures inside an internal cavity 109 to deflect along a longitudinal axis 110 through the center of the body. Each flexure includes three flexure legs that are spaced at 120°. Each flexure leg is attached in the axial direction between the proof mass 108 and the body 102. Eddy current sensor heads 112 and 114 are mounted on the body and extend through the flexures along longitudinal axis 110 on opposite sides of the proof mass 108 at distances d1 and d2. Each sensor head comprises a coil of copper wire epoxied to the end of a hollow stainless steel cylinder typically 0.25 to 0.5 inches long.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

Testing of Raytheon's open-loop hung mass accelerometer revealed that tight thermal control of this original design was required to achieve desired bias stability and scale factor error performance. In particular, body temperature gradients along the longitudinal axis could produce false acceleration readings.

The present invention provides an athermal open-loop hung mass accelerometer that addresses thermal limitations of the original design. In different embodiments, the sensor heads (formed of one or more materials) exhibit effective coefficients of thermal expansion (CTEs) such that the growth of the sensor heads along the longitudinal axis is approximately equal and opposite the growth of the body along the longitudinal axis in response to a predicted body temperature gradient to approximately null the effects of such a temperature gradient. If the predicted body temperature gradient is symmetric, the sensor head geometry and CTE are the same. If the predicted body gradient is asymmetric, the sensor heads may exhibit different CTEs to offset the body growth. Even if the actual applied temperature gradient is not the predicted body temperature gradient for which the sensor heads are configured, the effects of the applied temperature gradient can be lessened.

In an embodiment of the accelerometer, the length ($L_S$) of the sensor head is greater than one-half the body length ($L_B$) and less than $L_B$. The proof mass is thermally isolated from the body by the flexures and remains at an approximately constant temperature (subject to changes in bulk temperature) although the body sees the predicted body temperature gradient. In such configurations the sensor head CTEs are strictly less than the body CTE in order to null the response. Furthermore, the sensor head CTEs lie between 60%-80% of the body CTE.

In an embodiment, the body, first and second flexures and proof mass are integrally formed from a single piece of machined metal such as titanium or stainless steel. Titanium has a CTE of approximately 9e-6/° C. and stainless steel has a CTE of approximately 16e-6/° C. The sensor heads may be formed from materials such as alumina (CTE of 6.5e-6/° C.), glass bonded mica (CTE of 11.25e-6/° C.), Beryllia (CTE of 8.7e-6/C) or any other non-ferrous ceramic of appropriate CTE In an embodiment, the accelerometer is implemented with a proof mass of at least 0.01 Kg and exhibits a bias less than 10 micro-g's and scale factor error less than 10 ppm without tight thermal control.

In an embodiment, the accelerometer is mounted on another structure. A plate formed of the same material as the accelerometer body is placed between the accelerometer and the structure. For example, bolts may extend through the corners of the accelerometer and the plate to mount the accelerometer to the structure. The plate provides an intermediate surface having the same CTE as the body, which has the effect of eliminating stresses at this interface over temperature changes.

These and other features and advantages of the invention will be apparent to those skilled in the art from the following detailed description of preferred embodiments, taken together with the accompanying drawings, in which:

DETAILED DESCRIPTION OF THE INVENTION

Testing of Raytheon's open-loop hung mass accelerometer (described in U.S. Pat. No. 9,121,865) and herein referred to as the "original design" revealed that tight thermal control of this original design was required to achieve desired bias stability and scale factor error performance. Tight thermal control can be quite complex and expensive.

In particular, temperature gradients along the longitudinal axis could produce false accelerations. The body of the accelerometer is formed from a metal such as titanium or stainless steel. Titanium has a CTE of approximately 9e-6/° C. and stainless steel has a CTE of approximately 16e-6/° C. The sensor heads, which comprise a copper coil mounted on a stainless steel cylinder with epoxy, have a CTE of approximately 18e-6/° C. A change in the bulk temperature of the accelerometer causes the body and sensor heads to grow along the longitudinal axis in unequal and opposite directions producing a change in the nominal spacing or "gap" between the sensor heads and the proof mass. However, the change is the same for both sensor heads, and thus the net displacement is zero and does not produce a false acceleration reading. But when subjected to a body temperature gradient along the longitudinal axis, the original design exhibits unequal and opposite growth such that the changes in the nominal spacing or "gaps" are not equal, which in turn produces a net displacement that results in a false acceleration reading.

The present invention provides an athermal open-loop hung mass accelerometer that addresses the limitations of the original design with respect to longitudinal temperature gradients. The sensor heads are formed of one or more materials to have effective sensor CTEs such that the growth of the sensor heads along the longitudinal axis is approximately equal and opposite the growth of the body along the longitudinal axis in response to a predicted body temperature gradient to approximately null the effects (the "net displacement") of such a temperature gradient. If the predicted body temperature gradient is symmetric, the sensor head geometry and CTE are the same. If the predicted body gradient is asymmetric, the sensor heads may exhibit different CTEs to offset the body growth.

In certain accelerometer configurations, the length ($L_S$) of the sensor head is between one-half the body length ($L_B$) and the body length $L_B$. The proof mass is thermally isolated from the body by the flexures and remains at an approximately constant temperature (subject to changes in bulk temperature) although the body sees the predicted body temperature gradient. We have found that in such configurations the CTEs of the sensor heads is strictly less than the CTE of the body of the accelerometer in order to null the response. Furthermore, the CTEs of the sensor heads lie between 60%-80% of the CTE of the body to null the net displacement.

Figure 1:
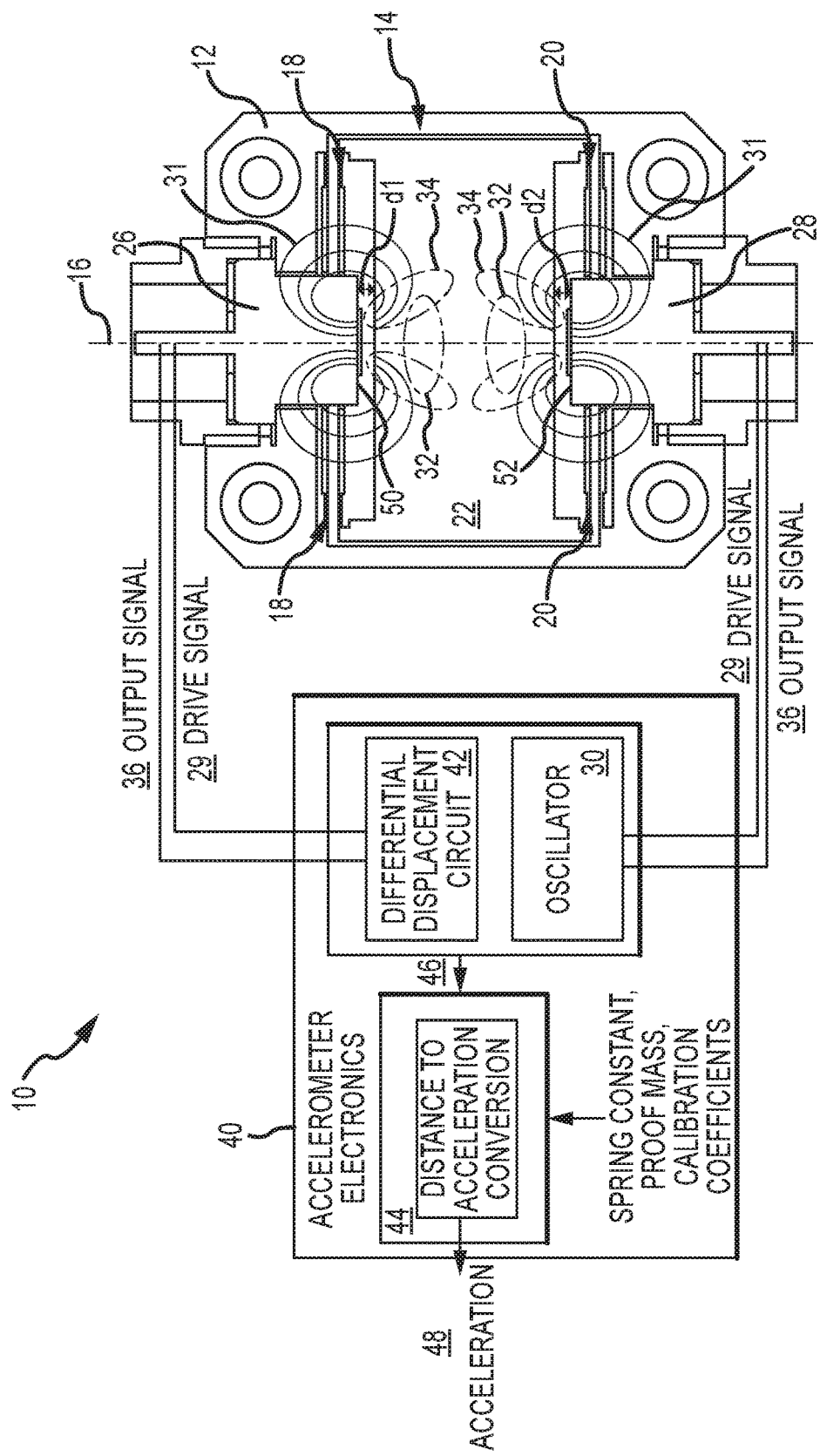
FIG. 1 is a schematic block diagram of an athermal open-loop hung mass accelerometer with differential Eddy current sensing in which the sensor head CTE are configured to null net displacement in response to a predicted body temperature gradient along the longitudinal axis.

As shown in FIG. 1, an embodiment of a thermally insensitive open-loop hung mass accelerometer 10 comprises a body 12 having an internal cavity 14 oriented along a longitudinal axis 16. First and second flexures 18 and 20 are attached to the body 12 at opposite ends of the internal cavity 14 in a collinear arrangement. The first and second flexures are compliant along the longitudinal axis. A proof mass 22 is attached between the first and second flexures to hang inside the internal cavity. The proof mass is suitably at least 0.01 kg. The proof mass is constrained to move in-line with the first and second flexure assemblies along longitudinal axis 16. The two flexures assemblies have known, and suitably equal, stiffness. Each flexure assembly may include a single flexure or a vertical stack of multiple flexures to provide the specified stiffness. The individual flexures are easier and less expensive to manufacture than a single flexure with the same specified stiffness. The accelerometer is suitably configured to provide a dampening of the motion of the proof mass 22 to inhibit resonance. One of the flexures may include magnets to provide magnetic dampening. Alternatively, the accelerometer may be mounted on an isolation system to ensure it is not excited in a manner that causes the motion of the proof mass exceeds its travel limits at resonance.

The accelerometer is suitably configured to be very stiff in the other five degrees of freedom i.e. the other two axes orthogonal to longitudinal axis 16 and the rotation around each of the three linear axes. For example, the flexures may have a stiffness that would allow displacement along longitudinal axis 16 with a 100 Hz frequency whereas the stiffness in the other five degrees of freedom may limit any motion to around a 1 kHz frequency minimizing cross-coupling of the device. Essentially the accelerometer is configured to allow motion only along longitudinal axis 16. An accelerometer may be provided for each of the three translations or a lesser subset thereof as required by a particular application.

The accelerometer suitably uses wire EDM manufacturing to cut the body, flexures and proof mass from a single piece of material such as titanium or stainless steel.

The accelerometer includes a differential Eddy current sensor to sense the displacement of the proof mass 22 along longitudinal axis 16. The sensor comprises first and second sensor heads 26 and 28 positioned on the body 12 inside the internal cavity 14 on opposite sides of the proof mass 22 at distances d1 and d2 that increase and decrease in opposition as the proof mass moves along longitudinal axis 16. The sensor heads are collinear with and extending through the flexures as shown. Alternately, the sensor heads could be collinear with and recessed behind the flexures. In this case, the proof mass would be stepped to extend through the flexures proximate the sensor heads at each end of the body. The interface between the sensor heads and the proof mass needs to be spaced away from the flexures to avoid false readings.

Each sensor head includes a reference coil responsive to an alternating drive signal 29 from a common oscillator 30 to produce an oscillating magnetic field 31. The magnetic field induces Eddy currents 32 in the proof mass 22 that create an opposing magnetic field 34 that resists the magnetic field 31 generated by the reference coil. The target surface on the proof mass should be at least three times larger than the diameter of the sensor head for normal, calibrated operation; otherwise, special calibration may be required. Any change in the distance (d1 or d2) between the reference coil and the proof mass due to a displacement d of the proof mass from a null position corresponding to no acceleration causes a change in the magnetic field interaction that alters an output signal 36. Typically, the output signal 36 is the drive signal 29 that has been altered in phase or amplitude by the field interaction.

If the proof mass 22 is closer to the top sensor head 26 than the bottom sensor head 28, the Eddy currents due to the top sensor head 26 are larger in the proof mass than the Eddy currents due to the second sensor head 28 (which is further away). This in turn modifies the excitation in the top sensor head 26 more than the excitation in the bottom sensor head 28. The impedances seen by the sensor heads change differentially with the displacement of the proof mass. Consequently the output signals 36 are altered differentially. In an embodiment, output signals 36 are the drive signals 29 that have been differentially altered in phase or amplitude.

Accelerator electronics 40 comprise three functional blocks; oscillator 30, a differential displacement circuit 42 and a distance-to-acceleration conversion circuit 44. Oscillator 30 provides the common drive signal 29 to excite sensor heads 26 and 28. Differential displacement circuit 42 compares output signals 36 from sensor heads 26 and 28 to provide an output 46 proportional to the displacement d of the proof mass 22 along longitudinal axis 16.

In an embodiment, differential displacement circuit 42 includes a tuned impedance (e.g. a series connected capacitor and resistor) that is connected in series with a reference coil of sensor head 26 to form a resonant circuit, a tuned impedance (e.g. a series connected capacitor and resistor) that is connected in series with a reference coil of sensor head 28 to form a resonant circuit, and an impedance change detector. The resonant circuits may be tuned to have the same or different resonant frequencies. In an embodiment, the resonant frequency of one circuit is slightly greater than the frequency of the drive current and the resonant frequency of the other circuit is slightly less than the frequency of the drive current.

When each reference coil is driven by the alternating drive current 29, an oscillating magnetic field is generated that induces Eddy currents in the proof mass 20. The Eddy currents induced in the proof mass circulate in Eddy current impedances represented by a parallel inductor and resistor connection in a direction to produce a secondary magnetic field opposite that of the reference coil, reducing the magnetic flux in the reference coil and thereby the reference coil inductance. The Eddy currents also dissipate energy, increasing the reference coil's effective resistance.

The reference coil constitutes the primary and the proof mass the (shorted) secondary of a weakly coupled air-core transformer. Displacement of the proof mass changes the coupling, and this displacement is reflected as an impedance change at the terminals of the reference coil, which in turn produces an altered drive current 36 As the proof mass approaches the reference coil, the inductance goes down and the reflected resistance increases. By electronically comparing the impedance changes in the two altered sensor head drive currents (such as amplitude and/or phase changes), the relative displacement between the two sensor heads can be determined accurately.

Output 46 may be a voltage or current signal that represents a change in impedance measured as a phase or amplitude of the output signal (e.g. altered drive signal) proportional to the displacement d. Knowing the mass of the proof mass, the spring constant (stiffness of the flexures) and any calibration coefficients, distance-to-acceleration circuit 44 converts output 46 to an acceleration 48 of the proof mass. These two functional circuits may, for example, be separate analog and digital circuits or may, for example, be a single circuit in which case output 46 may be an internal parameter.

Either the differential displacement circuit 42 or the distance-to-acceleration circuit 44 may perform an intermediate step of converting output 46 to a displacement d. As shown, the distance-to-acceleration circuit performs the conversion. For a given sensor head, $Lsnr(d/r)=Ls*(1-Ke^{-A(d/r)})$ where d is the coil to proof mass spacing, Lsnr is the total sensor inductance (nominal plus Eddy current induced), Ls is the reference coil inductance when the proof mass is infinitely far away (d=infinity), K=0.5 to 0.75 (for typical proof mass materials), A is a constant depending on the proof mass material and r is the reference coil winding radius. Similarly, the total sensor resistance is $Rsnr(d/r)=Rs*(1+C\ e^{-B(d/r)})$ where B and C are constants depending on the proof mass material and B>A and C<K. The relative increase in inductance is more significant than the decrease in reflected resistance for increasing d. Thus, the change in the reference coil inductance is the basis for Eddy current sensing. The differential phase or amplitude from output 46 is mapped to a change in differential impedance. This change in impedance is related to the distance d through the above equations.

Once displacement d is known, Hooke's law can infer the force F operating on the spring, i.e. F=kd, where k is the spring constant. Once the force F is known, acceleration is determined through Newton's Law F=Ma, where M is the mass of the proof mass. As previously discussed, Hooke's Law assumes that the spring constant k is in fact constant over the possible displacement range, which strictly speaking is not true at the levels of performance required for strategic grade performance. In addition, the sensor itself has nonlinearities due to non-perfect electronics and sometimes the physics of the sensing mechanism. The differential topology of the Eddy current sensor heads has the advantage that when the proof mass is far from one sensor head it is simultaneously close to the other sensor head. Consequently, without any further compensation the system output is more linear. Furthermore, it is simpler to remove any remaining non-linearity of both the spring constant as well as the sensor through calibration and the application of calibration coefficients to compute the displacement or acceleration. Owing to the thermal stability and linearity of the differential Eddy current sensor, the acceleration 48 is substantially linear with the displacement d of the proof mass over a specified range of motion.

The sensor heads 26 and 28 are formed of one or more materials having effective CTEs such that the growth of the sensor heads along the longitudinal axis 16 is approximately equal and opposite the growth of the body 18 along the longitudinal axis 16 in response to a predicted body temperature gradient to approximately null the effects (the "net displacement") of such a temperature gradient. Reference coils 50 and 52 are attached to the ends of the sensor heads. Epoxy may be used to attach the reference coils. The epoxy is suitably applied on top of the reference coils to keep the high CTE material out of the thermal path of the coil. If the predicted body temperature gradient is symmetric, the sensor head geometry and CTE are the same. If the predicted body gradient is asymmetric, the sensor heads may exhibit different CTEs to offset the body growth.

In certain accelerometer configurations, the length ($L_S$) of the sensor head is greater than one-half the body length ($L_B$) and less than the body length $L_B$. The body length is measured from the attachment point of the sensor head to the centerline of the proof mass. The sensor length is measured from the same attachment point to the end of the sensor head. The proof mass is thermally isolated from the body by the flexures and remains at an approximately constant temperature (subject to changes in bulk temperature) although the body sees the predicted body temperature gradient. The gradient does not affect the temperature of the proof mass. We have found that in such configurations the CTEs of the sensor heads is strictly less than the CTE of the body of the accelerometer in order to null the response. Furthermore, the CTEs of the sensor heads lie between 60%-80% of the CTE of the body to null the net displacement.

Figure 2A:
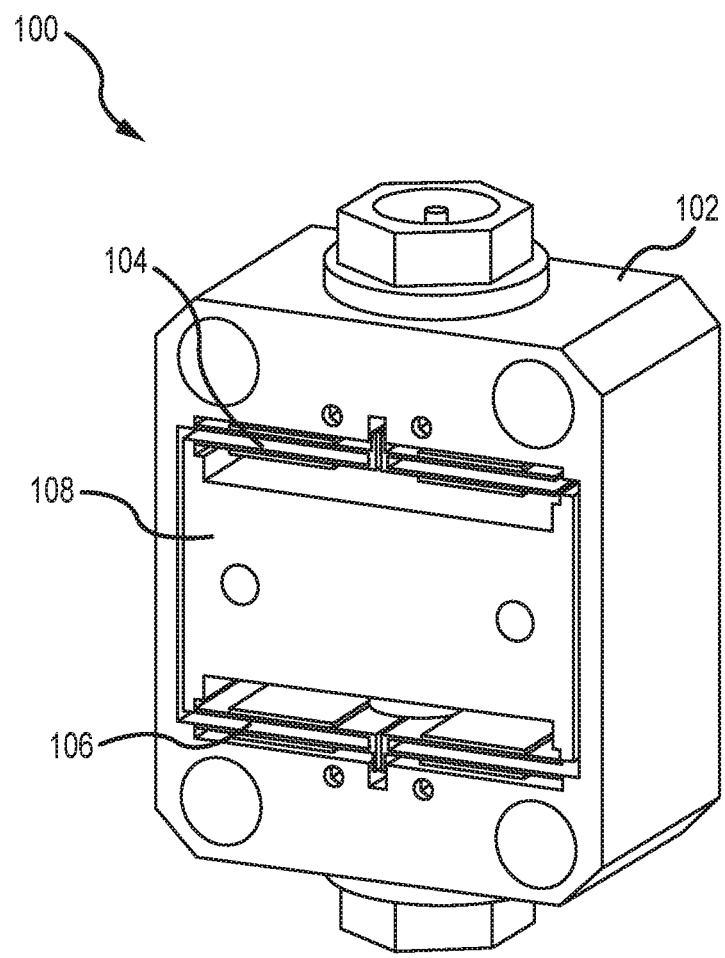
FIGS. 2a and 2b are different views of an embodiment of an athermal open-loop hung mass accelerometer sans the electronics.
Figure 2B:
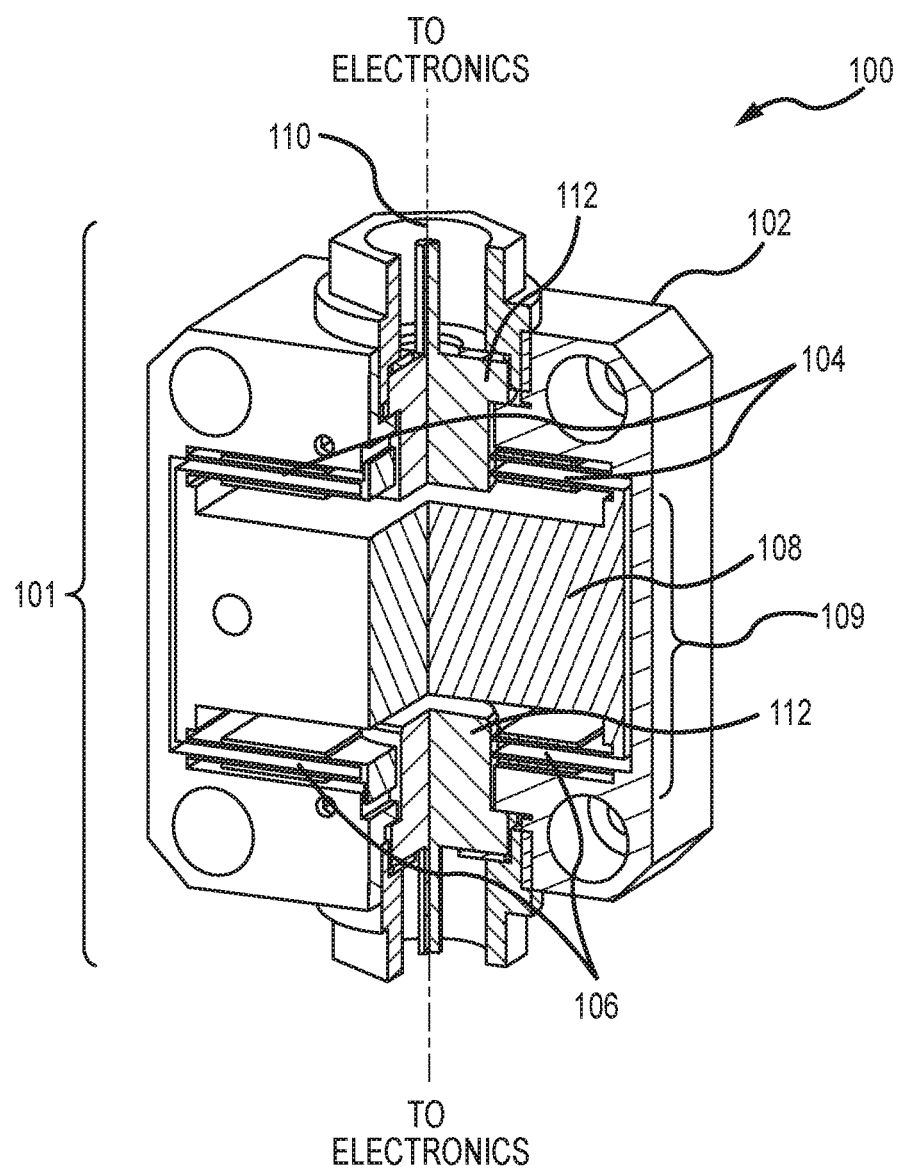

With reference now to FIGS. 2a and 2b, an embodiment of an open-loop hung mass accelerometer 100 sans the electronics comprises a single piece of metal 101 (e.g. Ti 6Al-4V or 17-4PH stainless steel) machined to form a body 102, top and bottom flexures 104 and 106 (e.g., a stack of one or more flexures) and a proof mass 108 suspended between the flexures inside an internal cavity 109 to deflect along a longitudinal axis 110 through the center of the body. The flexures are rectangular with approximately the same footprint as proof mass 108 except for a hole in the middle to receive the sensor heads. The flexures allow movement of the proof mass in the compliant direction along longitudinal axis 110 at a resonance of ~100 Hz. The body restricts movement in the non-compliant directions orthogonal to longitudinal axis 110 or in rotation about any of the linear axes to reduce unwanted cross coupling of transverse accelerations into the main sensing axis. These other modes are all >~10 times the frequency of the compliant direction (in this case 100 Hz) and do not nominally result in sensed motion. The structure is about ~1.6"×1.1"×0.6" and weighs about ~0.10 lbs. Metal 101 is machined to form openings around and along longitudinal axis 110 on either side of proof mass 108 to receive Eddy current sensor heads 112 and 114. The sensor heads lie within and collinear with the flexures and the longitudinal axis of motion. The sensor heads exhibit an effective CTE to null the net displacement for a predicted body temperature gradient. The sensor head CTE is strictly less than the body CTE and is most typically 60-80% of the body CTE for standard accelerometer geometries.

Figure 3A:
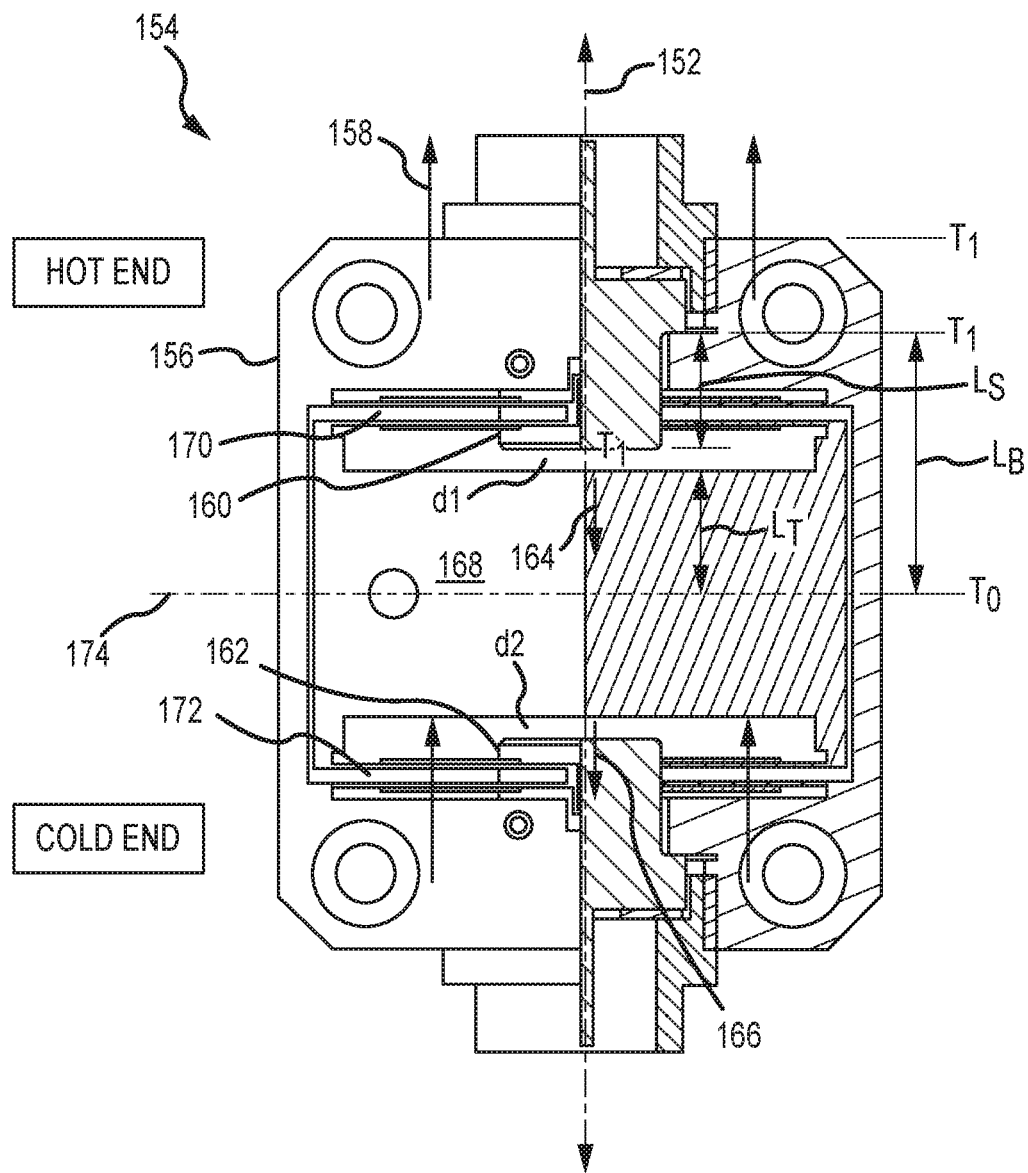
FIGS. 3a and 3b are section views of the accelerometer illustrating the geometry of the sensor heads and body and a predicted body temperature gradient along the longitudinal axis.
Figure 3B:
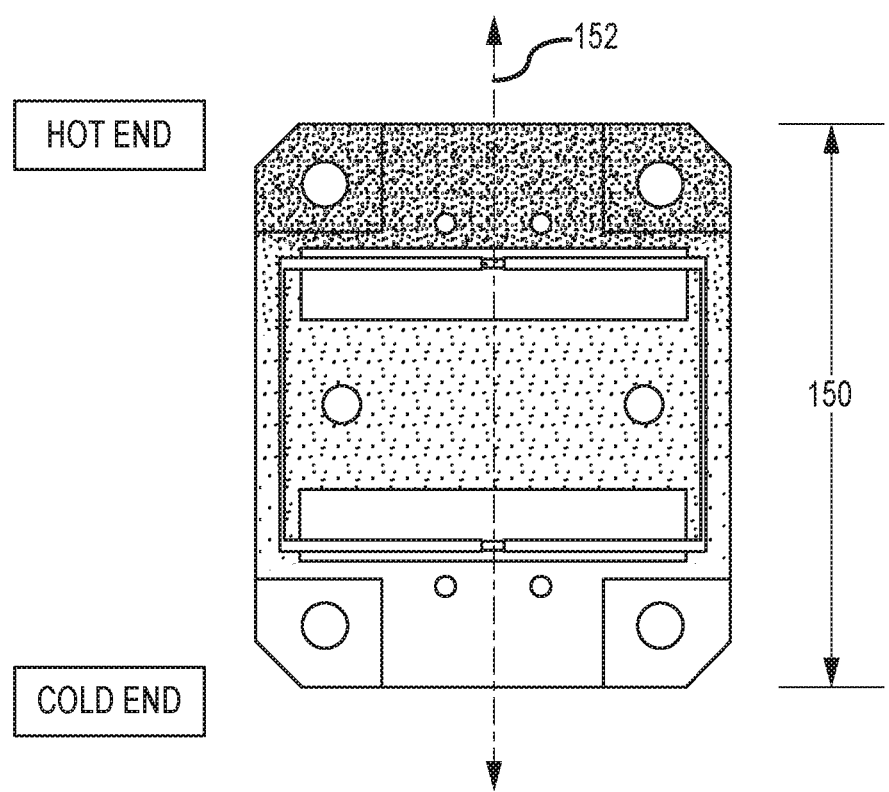

With reference now to FIGS. 3a and 3b, a predicted body temperature gradient 150 is assumed along a longitudinal axis 152 of a hung mass accelerometer 154. The directions of growth due to the temperature gradient 150 for a body 156 are indicated by arrows 158 and for sensor heads 160, 162 by arrows 164, 166, respectively. Proof mass 168 is thermally isolated by the flexures 170 and 172. The dimensions of the flexures, thin and narrow, present a very high thermal impedance that effectively isolates the proof mass. As a consequence, the temperature of proof mass 168 is unaffected by the temperature gradient. Its temperature does move with changes in the bulk temperature.

The sensor CTE is selected such that the sensor head growth is equal and opposite the body growth to null any displacement caused by the predicted body temperature gradient 150. The sensor CTE is a function of the predicted body temperature gradient 150, the body CTE and the geometry (i.e., lengths) of the body and sensor head measured with respect to a centerline 174 of proof mass 168. The sensor CTE can be estimated via a simple calculation (i.e., one that assumes a uniform temperature gradient) or an extrapolation that can incorporate more complex temperature gradients.

The geometric and thermal variables for the accelerometer are defined as follows:
$L_S$=sensor length from point of attachment of the sensor head to the body to the coil at the end of the sensor head;
$L_B$=Body length from point of attachment of the sensor head to the body to the center line of the proof mass;
$L_T$=target length is the thickness of the proof mass from the center line;
$\alpha_S$=sensor CTE;
$\alpha_B$=body CTE;
$T_0$=initial temperature of the body temperature gradient (physically coincident with the center line of the proof mass but not necessarily the temperature of the proof mass which is thermally isolated);
$\Delta T_B$=effective temperature change due to the body gradient; and
$\Delta T_S$=temperature change of the sensor.

The thermoelastic temperature growth of a material is defined by:

$$\Delta L = \alpha L \Delta T. \quad (1)$$

Ignoring the effects of bulk temperature changes, which cancel and do not effect the net displacement, to maintain a consistent gap between the sensor head and target due to a body temperature gradient along the longitudinal axis, it is desired that:

$$\Delta L_B = \Delta L_S. \quad (2)$$

Therefore:

$$\alpha_B L_B \Delta T_B = \alpha_S L_S \Delta T_S \text{ and} \quad (3)$$

$$\frac{\alpha_S}{\alpha_B} = \frac{L_B}{L_S} \frac{\Delta T_B}{\Delta T_S} \quad (4)$$

Assuming a linear conduction gradient over length $L_B$:

$$\Delta T_B = \frac{T_1 + T_0}{2} - T_i = \frac{T_1 - T_0}{2} \quad (5)$$

Assuming a uniform temperature change of the sensor:

$$\Delta T_S = T_1 - T_0 \quad (6)$$

Relationship (4) then simplifies to:

$$\frac{\alpha_S}{\alpha_B} = 0.5 \frac{L_B}{L_S} \quad (7)$$

The above calculation simplifies the temperature distribution into regions of constant temperature or linear gradients. The use of finite element software is the most accurate way to predict more real world potential temperature gradient and the consequential thermoelastic growth of the accelerometer body and sensor head.

Geometry may be constrained to a limited range by other design requirements. A minimum sensor length is needed to protrude past the flexure blades. The sensor length is also governed by the specific gap needed between the sensor and the target. Target height is defined in part by the size/mass of the proof mass needed to achieve the 100 Hz bandwidth. $L_B$ is necessarily greater than $L_S$ given the target height and gap. With only minimal flexibility in the geometry permitted, and the temperature profile dictated, variation in relative CTE's ($\alpha_S/\alpha_B$) between the body and sensor head is used to maintain a consistent gap between the sensor tip and the target.

Best operation of the eddy current sensor requires that the sensor head extend beyond the flexure blades. In one embodiment, design that gave $L_B/L_S=1.2$. The effective gradient $\Delta T$ of the body was roughly 60% that of the sensor head. This gives $\alpha_S/\alpha_B=1.2*0.6=72\%$. The geometry can be manipulated to increase $\Delta T_B/\Delta T_S$. This is done by increasing the body length $L_B$ so as to decrease the relative length over which the gradient mostly occurs. To maintain the same gap between the sensor head and proof mass, $L_S$ increases by the same amount. The ratio $L_B/L_S$ gets closer to 1. Now for example $L_B/L_S=1.1$ and $\Delta T_B/\Delta T_S=65\%$ then $\alpha_S/\alpha_B=1.1*0.65=71.5\%$ and the ideal sensor CTE does not change significantly. In summary, $\Delta T_B/\Delta T_S$ increases by altering the body geometry, typically increasing $L_B$. Increasing lengths decreases $L_B/L_S$ for the same sensor head gap. The variation in these two ratios counteract each other so $\alpha_S/\alpha_B$ is not particularly sensitive. For some exemplary accelerometers in which $0.5*L_B<L_S<L_B$ and the proof mass is thermally isolated from the body, $0.6\alpha_B<\alpha_S<0.8*\alpha_B$ or equivalent $\alpha_S$ is 60-80% of $\alpha_S$.

In order to achieve the specified sensor CTE for a given accelerometer design and body temperature gradient, the sensor head may need to be fabricated from multiple materials of lengths $L_1, L_2, \ldots L_n$ and CTEs $\alpha_1, \alpha_2, \ldots$. The effective CTE of the sensor head is given by:

$$\alpha_{\mathit{eff}} = \frac{(\alpha_1 L_1 + \alpha_2 L_2 + \ldots \alpha_n L_n)}{L_1 + L_2 + \ldots L_n}$$

If the predicted body temperature gradient is asymmetric, embodiments can include either a symmetric sensor head design that accommodates the asymmetry as best possible or different CTEs for the sensor heads to optimize each side of the accelerometer.

Figure 4:
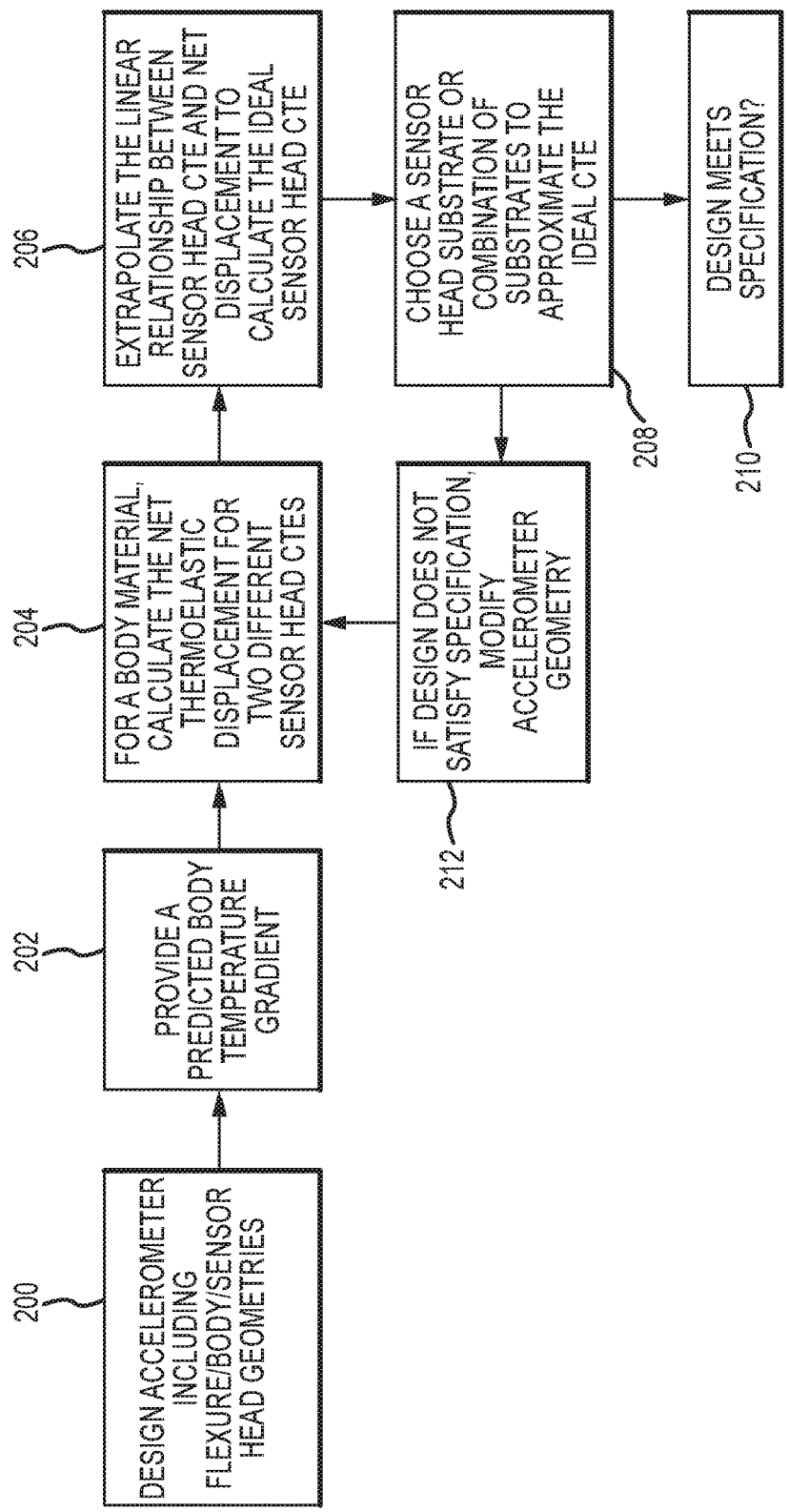
FIG. 4 is a flow diagram of an embodiment for determining the sensor head CTE to null net displacement of the sensor heads to a predicted body temperature gradient.

Another approach for determining the sensor CTE is given by the design flow of FIG. 4. Provide an accelerometer design including the flexure, body and sensor head geometries to satisfy proof mass mass requirements, flexure shape and sensor head-to-proof mass gap requirements (step 200). Provide a predicted body temperature gradient for the accelerometer along the longitudinal axis (step 202). For a given material for the body/flexure/proof mass, calculate the net thermoelastic displacement (change in the sensor head-to-proof mass gap) for two different sensor head CTEs (step 204). The two sensor head CTEs can be selected arbitrarily or based on a priori knowledge of similar designs. Extrapolate the relationship between the sensor head CTE and net displacement to calculate an ideal sensor head CTE to null the net displacement (step 206). A sensor head substrate or combination of substrates (length and CTE) are selected to approximate the ideal CTE (step 208). If the design meets the performance specification, the design is complete (step 210). If not, modify the geometry of the accelerometer (step 212) and repeat until a satisfactory design is produced.

Figure 5:
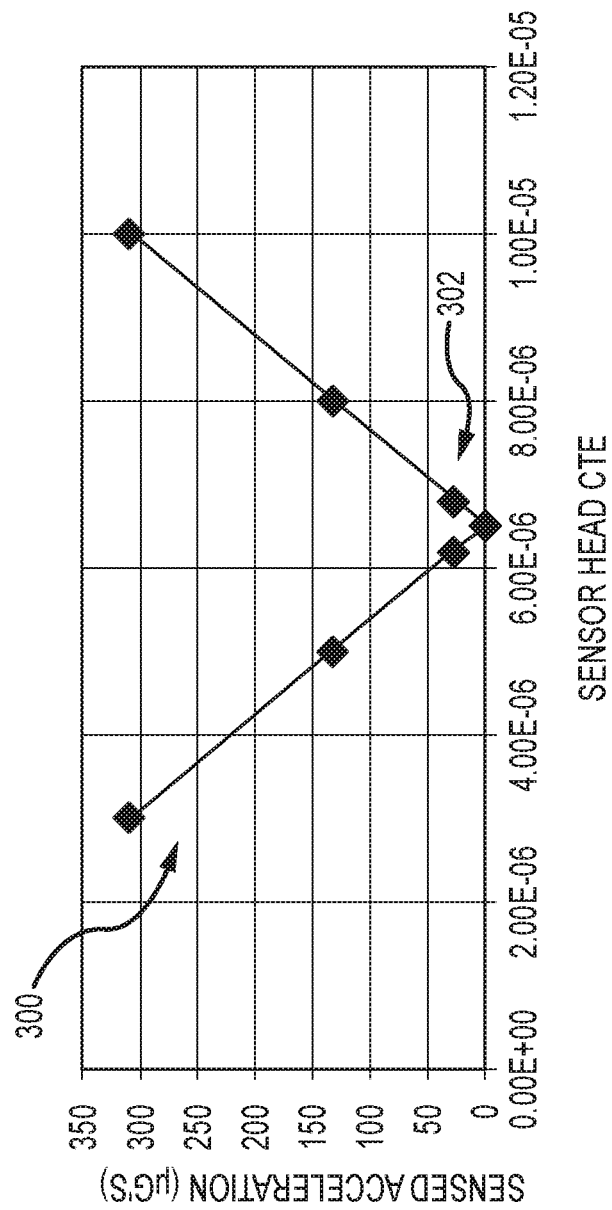
FIG. 5 is a plot of a sensed acceleration vs. sensor head CTE for a 1K body gradient along the longitudinal axis.

By way of comparison, an accelerometer manufactured from a block of titanium has a body CTE of 9e-6° C. A predicted body temperature gradient having a variation of 1 degree is compared. The stainless steel and epoxy sensor heads of the original design have a CTE of 18e-6° C. This produced a false acceleration reading of approximately 1,000 µGs. A tuned alumina sensor head has a CTE of approximately 6.5e-6° C. As shown in FIG. 5, the false acceleration reading 300 is quite sensitive to sensor head CTE. The matched sensor head CTE produced a false acceleration reading 302 of less than 5 µGs, more than a 200× improvement over the original design. If the sensor head CTE is not properly matched, the false acceleration reading increases rapidly. The plot further shows that simply forming the sensor head of materials with near zero CTE is not effective to null out the effects of a body temperature gradient along the longitudinal axis.

Figure 6:
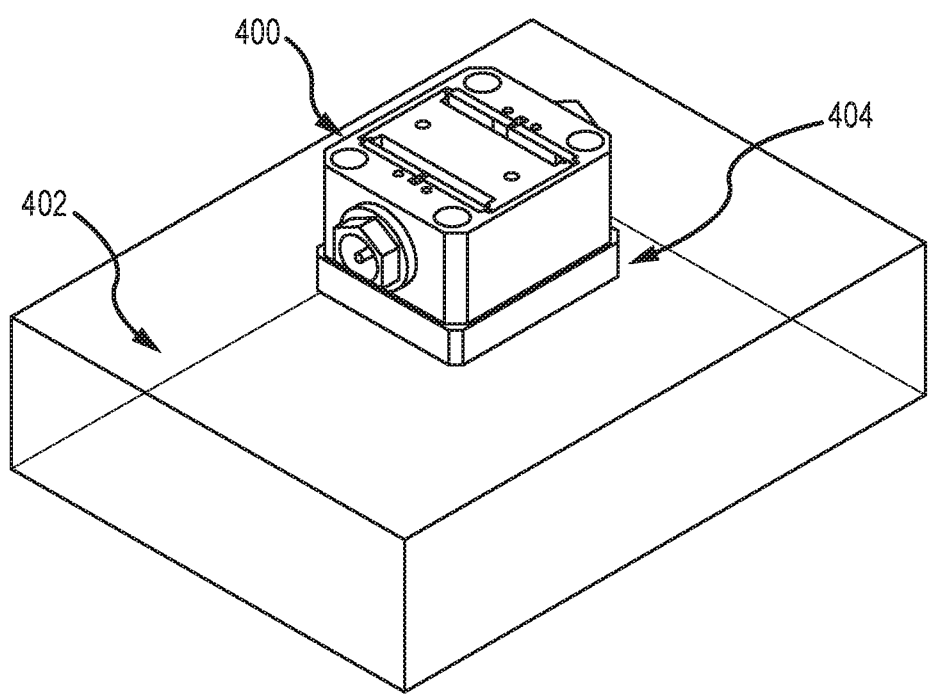
FIG. 6 is a diagram of an embodiment of the accelerometer mounted through an intermediate plate to a structure.

As shown in FIG. 6, an accelerometer 400 is mounted to another structure 402. A plate 404 formed of the same material as the accelerometer body is placed between the accelerometer and the structure. The plate forms a mounting surface for the accelerometer. Bolts extend through the corners of the accelerometer and the plate to mount the accelerometer to the structure. The plate provides an intermediate surface having the same CTE as the body, which has the effect of eliminating stresses at this interface over temperature changes. Further design techniques can be used when mounting this intermediate plate to a greater structure of differing CTE. These techniques might include but are not limited to the use of a single fastener connection at the plate center serving to kinematically mount the plate and minimize conduction gradients across the plate by way of a single, centered contact point.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:
1. A hung mass accelerometer, comprising:
a body having an internal cavity oriented along a longitudinal axis, said body formed of one or more materials having an effective body coefficient of thermal expansion (CTE);
first and second flexures attached to the body at opposite ends of the internal cavity, said first and second flexures compliant along the longitudinal axis;

a proof mass between the first and second flexures to hang inside the internal cavity, said proof mass allowed to move along the longitudinal axis in an open-loop configuration;

first and second sensor heads mounted on the body on opposite ends of the internal cavity along the longitudinal axis on opposite sides of the proof mass at distances d1 and d2 that increase and decrease in opposition as said proof mass moves along the longitudinal axis, each said sensor head having a reference coil responsive to an alternating drive signal to produce an oscillating primary magnetic field that induces Eddy currents in the proof mass that create an opposing secondary magnetic field that resists the primary magnetic field generated by the reference coil, any change in a distance between the reference coil and the proof mass causing a change in a magnetic field interaction that produces differential alterations to the alternating drive signal, said first and second sensor heads formed of one or more materials having effective first and second sensors CTEs such that a growth of said first and second sensor heads along the longitudinal axis is equal and opposite the growth of said body along the longitudinal axis in response to a predicted body temperature gradient along the longitudinal axis to approximately null the effects on the alternating drive signal.

2. The hung mass accelerometer of claim 1, wherein the effective first and second CTEs of said first and second sensor heads are configured based on the geometries of the first and second sensor heads and the body, the effective body CTE and the predicted body temperature gradient.

3. The hung mass accelerometer of claim 1, wherein said effective first and second CTEs of said first and second sensor heads are each less than the effective body CTE.

4. The hung mass accelerometer of claim 1, wherein said effective first and second CTEs of said first and second sensor heads are between 60% and 80% of the effective body CTE.

5. The hung mass accelerometer of claim 4, wherein $0.5*L_B < L_S < L_B$ where $L_B$ is a length from an attachment point of the first and second sensor heads to the body to a centerline of the proof mass and $L_S$ is a length from the attachment point to an edge of the first and second sensor heads, wherein the proof mass is substantially thermally isolated from the body by the first and second flexures.

6. The hung mass accelerometer of claim 1, wherein the proof mass has a mass of at least 0.01 kg and a resulting acceleration has a bias less than 10 micro-g's and a scale factor error less than 10 parts per million in an environment in which the predicted body temperature gradients are less than 1 Kelvin.

7. The hung mass accelerometer of claim 1, wherein the predicted body temperature gradient is asymmetric about the proof mass, wherein said effective first and second sensor CTEs are different.

8. The hung mass accelerometer of claim 1, wherein the body, the first and second flexures and the proof mass are integrally formed from a single piece of metal.

9. The hung mass accelerometer of claim 1, wherein the first and second flexures and the proof mass have a rectangular footprint.

10. The hung mass accelerometer of claim 1, further comprising a mounting plate formed of the same material as the body and attached to the body to form a mounting surface of the accelerometer.

11. The hung mass accelerometer of claim 1, further comprising electronics including
an oscillator that generates the alternating drive signal;
a first electrical circuit configured to compare the altered drive signals from the first and second sensor heads to provide an output proportional to the displacement of the proof mass along the longitudinal axis; and
a second electrical circuit configured to convert the output to a measured acceleration of the body knowing a mass of the proof mass and a stiffness of the first and second flexure assemblies.

12. A hung mass accelerometer, comprising:
a body having an internal cavity oriented along a longitudinal axis, said body formed of one or more materials having an effective body coefficient of thermal expansion (CTE);
first and second flexures attached to the body at opposite ends of the internal cavity, said first and second flexures compliant along the longitudinal axis;
a proof mass between the first and second flexures to hang inside the internal cavity, said proof mass allowed to move along the longitudinal axis in an open-loop configuration;
first and second sensor heads mounted on the body on opposite ends of the internal cavity along the longitudinal axis on opposite sides of the proof mass at distances d1 and d2 that increase and decrease in opposition as said proof mass moves along the longitudinal axis, each said sensor head having a reference coil responsive to an alternating drive signal to produce an oscillating primary magnetic field that induces Eddy currents in the proof mass that create an opposing secondary magnetic field that resists the primary magnetic field generated by the reference coil, any change in a distance between the reference coil and the proof mass causing a change in a magnetic field interaction that produces differential alterations to the alternating drive signal,
said first and second sensor heads formed of one or more materials having effective first and second sensors CTEs of 60-80% of the effective body CTE to null the effects on the alternating drive signal of a body temperature gradient along the longitudinal axis.

13. The hung mass accelerometer of claim 12, wherein the body, the first and second flexures and the proof mass are integrally formed from a single piece of metal.

14. The hung mass accelerometer of claim 12, further comprising a mounting plate formed of the same material as the body and attached to the body to form a mounting surface of the accelerometer.

15. A hung mass accelerometer, comprising:
a body having an internal cavity oriented along a longitudinal axis, said body formed of one or more materials having an effective body coefficient of thermal expansion (CTE);
first and second flexures attached to the body at opposite ends of the internal cavity, said first and second flexures compliant along the longitudinal axis;
a proof mass between the first and second flexures to hang inside the internal cavity, said proof mass allowed to move along the longitudinal axis in an open-loop configuration, wherein said body, said first and second flexures and said proof mass are integrally formed from a single piece of metal of either titanium or stainless steel;
first and second sensor heads mounted on the body on opposite ends of the internal cavity along the longitudinal axis on opposite sides of the proof mass at distances d1 and d2 that increase and decrease in opposition as said proof mass moves along the longitudinal axis, each said sensor head having a reference coil responsive to an alternating drive signal to produce an oscillating primary magnetic field that induces Eddy currents in the proof mass that create an opposing secondary magnetic field that resists the primary magnetic field generated by the reference coil, any change in a distance between the reference coil and the proof mass causing a change in a magnetic field interaction that produces differential alterations to the alternating drive signal, said first and second sensor heads have a length $L_S$ from an attachment point of the first and second sensor heads to the body to an edge of the first and second sensor heads and a length $L_B$ from the attachment point to a centerline of the proof mass wherein $0.5*L_B < L_S < L_B$;

said first and second flexures configured to substantially thermally isolate the proof mass from the body;

said first and second sensor heads formed of one or more materials having effective first and second sensors CTEs of 60-80% of the effective body CTE such that a growth of said first and second sensor heads along the longitudinal axis is equal and opposite a growth of said body along the longitudinal axis in response to a predicted body temperature gradient along the longitudinal axis to null the effects on the alternating drive signal.

16. The hung mass accelerometer of claim 15, wherein the body, the first and second flexures and the proof mass are integrally formed from a single piece of metal.

17. The hung mass accelerometer of claim 15, further comprising a mounting plate formed of the same material as the accelerometer body and attached to the accelerometer body to form a mounting surface of the accelerometer.

* * * * *